Aug. 29, 1944.   J. P. PUTNAM   2,357,131
NAVIGATION INSTRUMENT
Filed Sept. 28, 1942   8 Sheets-Sheet 4

INVENTOR:
John P. Putnam
by Dike, Calver & Porter
Attys.

Aug. 29, 1944.  J. P. PUTNAM  2,357,131
NAVIGATION INSTRUMENT
Filed Sept. 28, 1942   8 Sheets—Sheet 5
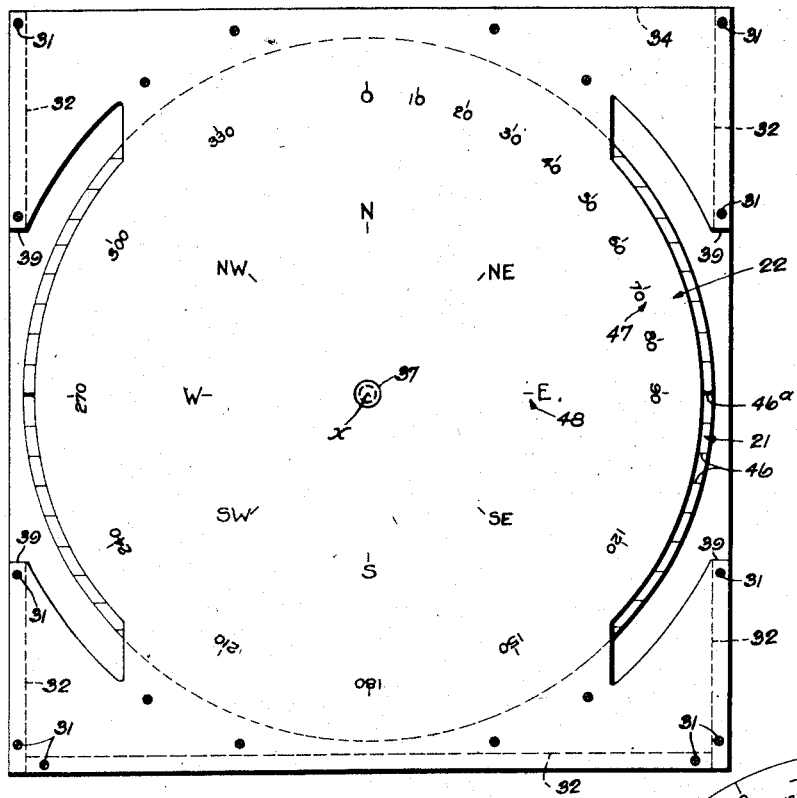
Fig. 5
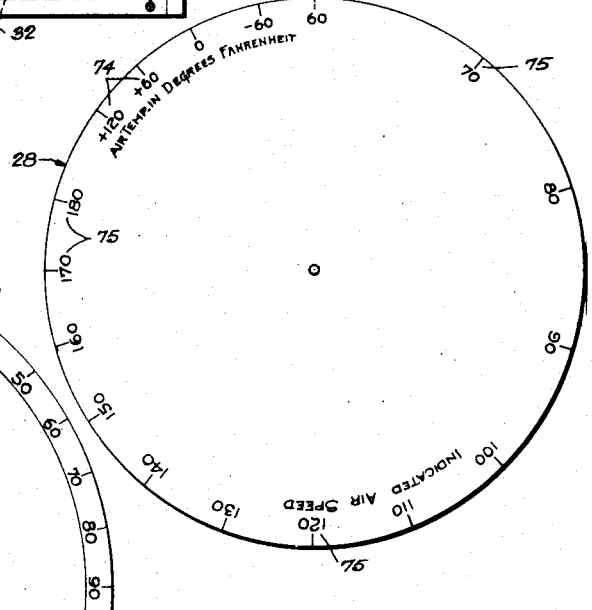
Fig. 13
Fig. 14
INVENTOR:
John P. Putnam
by
Dike, Calver & Porter
Attys.

Aug. 29, 1944.          J. P. PUTNAM                 2,357,131
                     NAVIGATION INSTRUMENT
              Filed Sept. 28, 1942         8 Sheets-Sheet 6
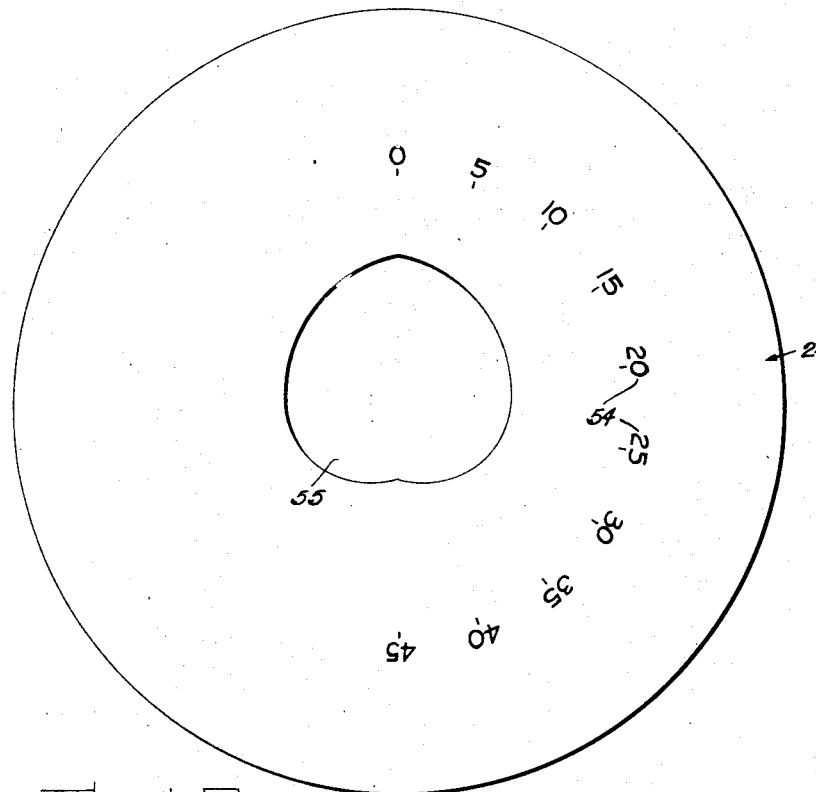
Fig_8
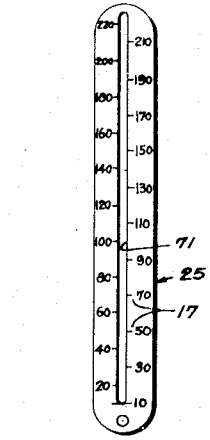
Fig_12
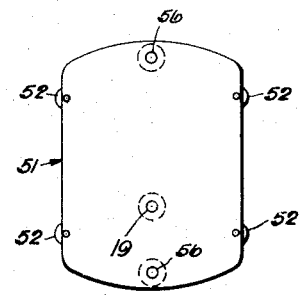
Fig_7
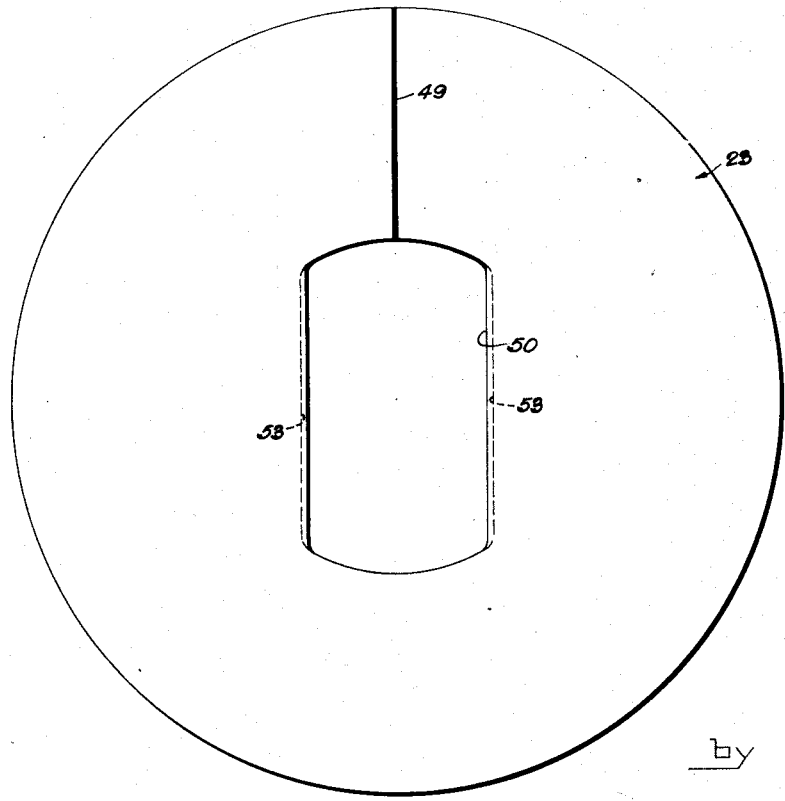
Fig_6
INVENTOR:
John P. Putnam
by Dike, Calver & Porter
Att'ys.

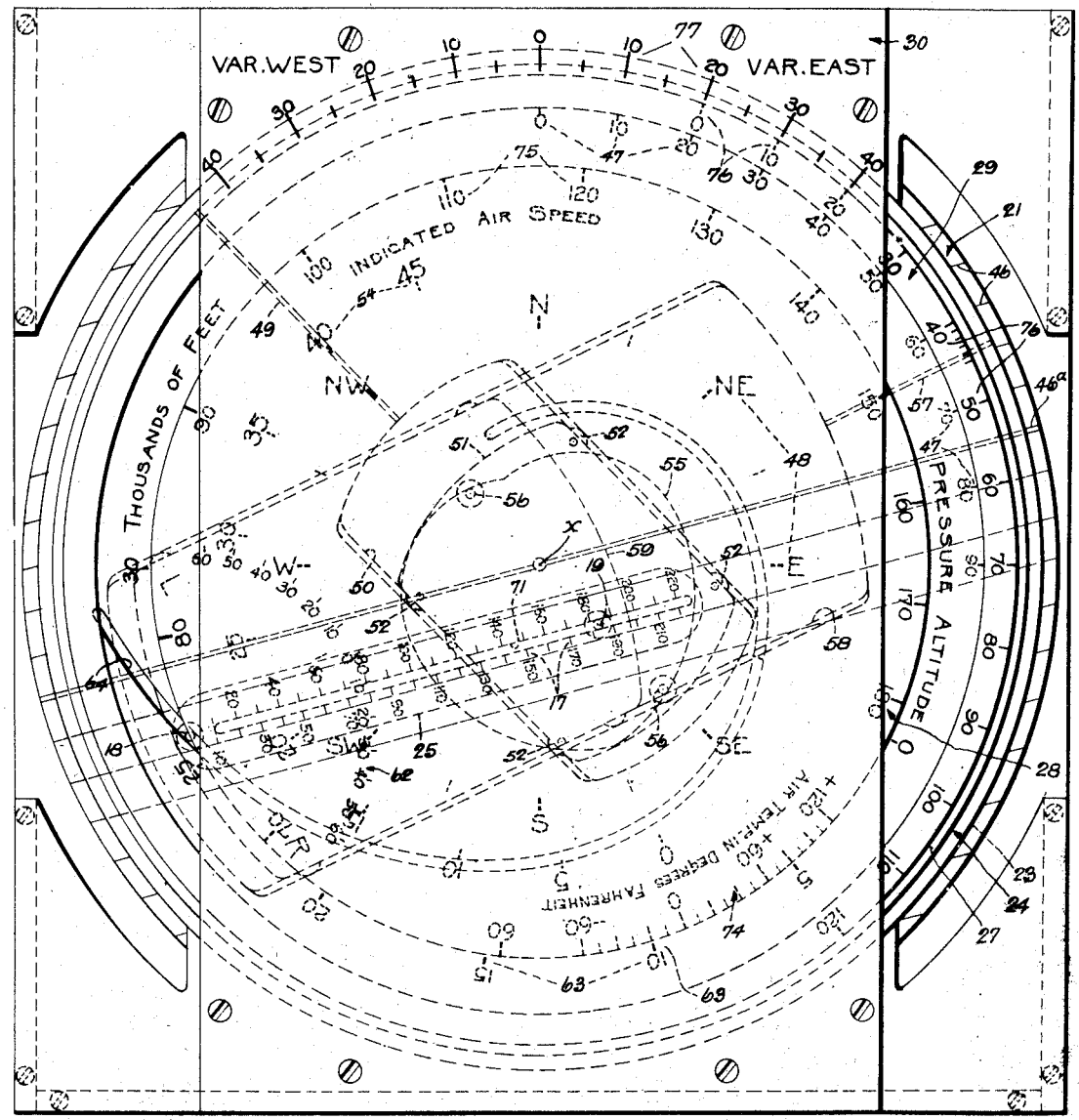
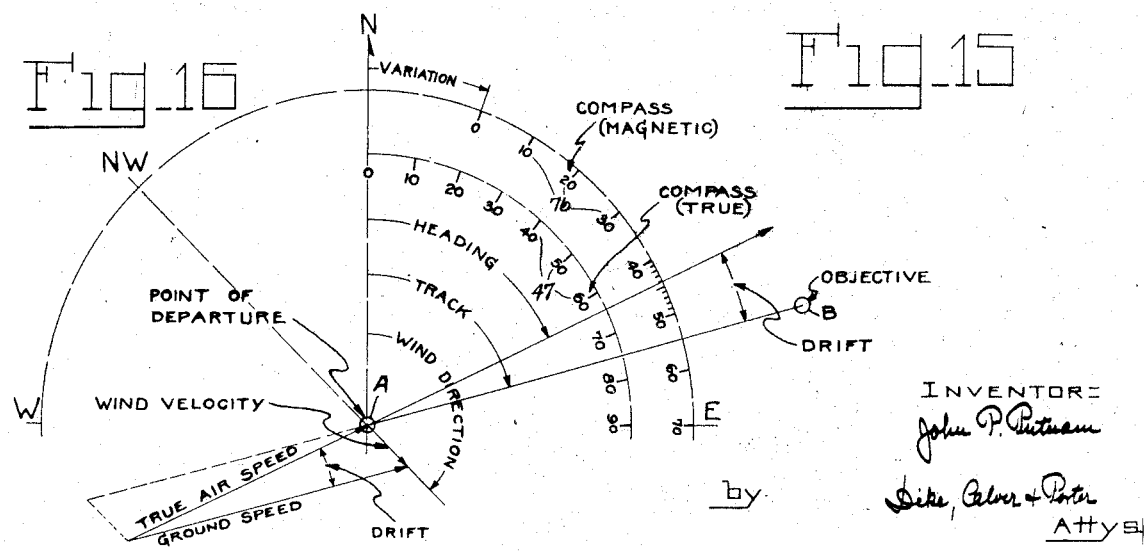

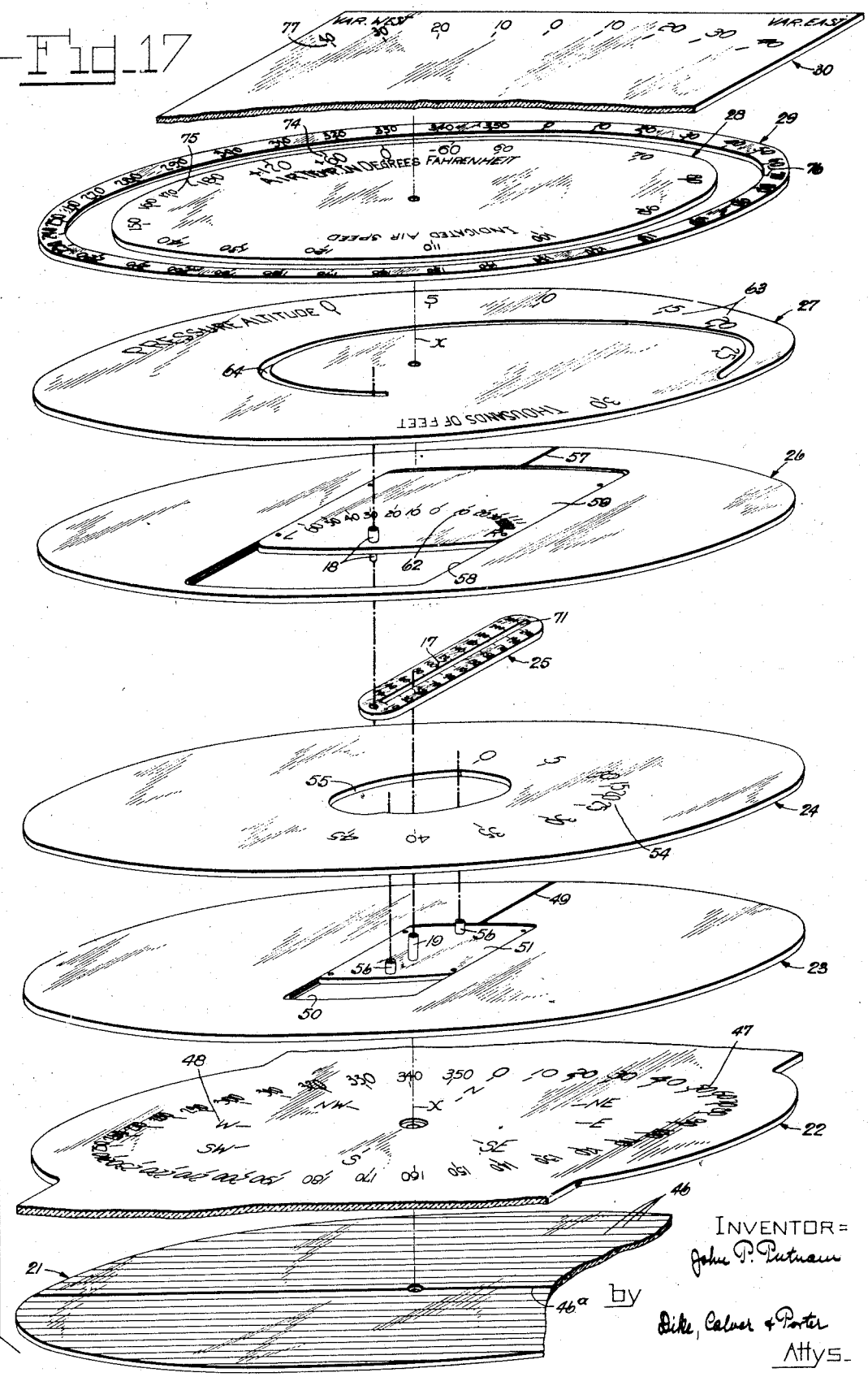

Patented Aug. 29, 1944

2,357,131

UNITED STATES PATENT OFFICE 2,357,131

NAVIGATION INSTRUMENT

John P. Putnam, Boston, Mass., assignor to The Reece Button Hole Machine Company, Boston, Mass., a corporation of Maine Application September 28, 1942, Serial No. 459,922

17 Claims. (Cl. 33—1)

This invention relates to navigation instruments and more particularly, though not exclusively, to instruments for use in aerial navigation.

Known instruments of the type under consideration can be set in accordance with such readily ascertainable factors or conditions as the true course of an objective to be reached, the indicated air speed of a plane, and the direction and velocity of the wind, whereupon these instruments will immediately and directly indicate the ground speed of the plane and the compass course to be followed in order to reach the objective under these conditions. The principle involved in these instruments is to represent the indicated air speed of a plane and the wind velocity as vectors of a parallelogram of motion in which the resulting vector indicates the track or true direction of flight of the plane and its length represents the ground speed of the plane when flying in said true direction. In practice, these vectors are formed by linear speed or velocity scales of equal uniform calibration which, by separate adjustment, are coordinated to form a parallelogram of motion commensurate with the indicated air speed of the plane and the velocity and relative direction of the wind. However, it is somewhat difficult to maintain these scales in alignment while using the instrument under flight conditions. Instruments incorporating these linear scales are usually also very bulky due to the considerable length of these scales (to cover the widely varying indicated speed ratings of modern planes) and their imperative wide range of relative adjustment to meet all conditions. Moreover, navigation instruments providing also for correction of the indicated air speed of a plane, due to such factors as pressure altitude and/or temperature, are equipped with separate calculators or computers for that purpose which require preliminary setting in accordance with the indicated air speed, temperature, and altitude, and reading of the true air speed, before the navigation instrument can be set in accordance with the true air speed thus obtained.

It is the primary aim and object of the present invention to provide a navigation instrument having only one linear scale which directly indicates the ground speed and the track or path of projection of an airplane along the ground, on setting the instrument in accordance with the indicated air speed of the plane, the point of departure and the objective to be reached on a map, and a given velocity and direction of the wind.

It is another object of the present invention to provide the instrument with relatively turnable dials by the sole manipulation of which the instrument is set, and which will remain set during flight.

It is another object of the present invention to provide an instrument which will reduce to a maximum degree any overlapping or congestion of scales.

It is another object of the present invention to make provision in the instrument for setting it also directly in accordance with a given pressure altitude and/or a given temperature and thereby dispense with the customary preliminary determination of the true air speed and the subsequent setting of the navigation instrument in accordance therewith.

The foregoing and other objects of the invention, together with means whereby the latter may be carried into effect will best be understood from the following description of an illustrative embodiment shown in the accompanying drawings: in which, Fig. 1 is a diagram illustrating the principle of operation involved in the present instrument.

Figs. 2A and 2B are diagrammatic views to be referred to.

Fig. 5 is a reduced section taken substantially on the line 5—5 of Fig. 3, showing the true compass point plate.

Fig. 6 is a detail plan view of the wind direction disc.

Fig. 7 is a detail plan view of the wind direction disc slide.

Fig. 8 is a detail plan view of the wind velocity disc.

Fig. 12 is a detail plan view of the combined track and ground speed scale.

Fig. 13 is a detail plan view of the air speed correction disc.

Fig. 14 is a detail plan view of the magnetic compass ring.

Fig. 15 is a view similar to Fig. 2, showing the instrument in use.

Fig. 16 is a diagram to be referred to.

Fig. 17 is a perspective view of the active parts of the instrument shown disassembled.

Figure 1:
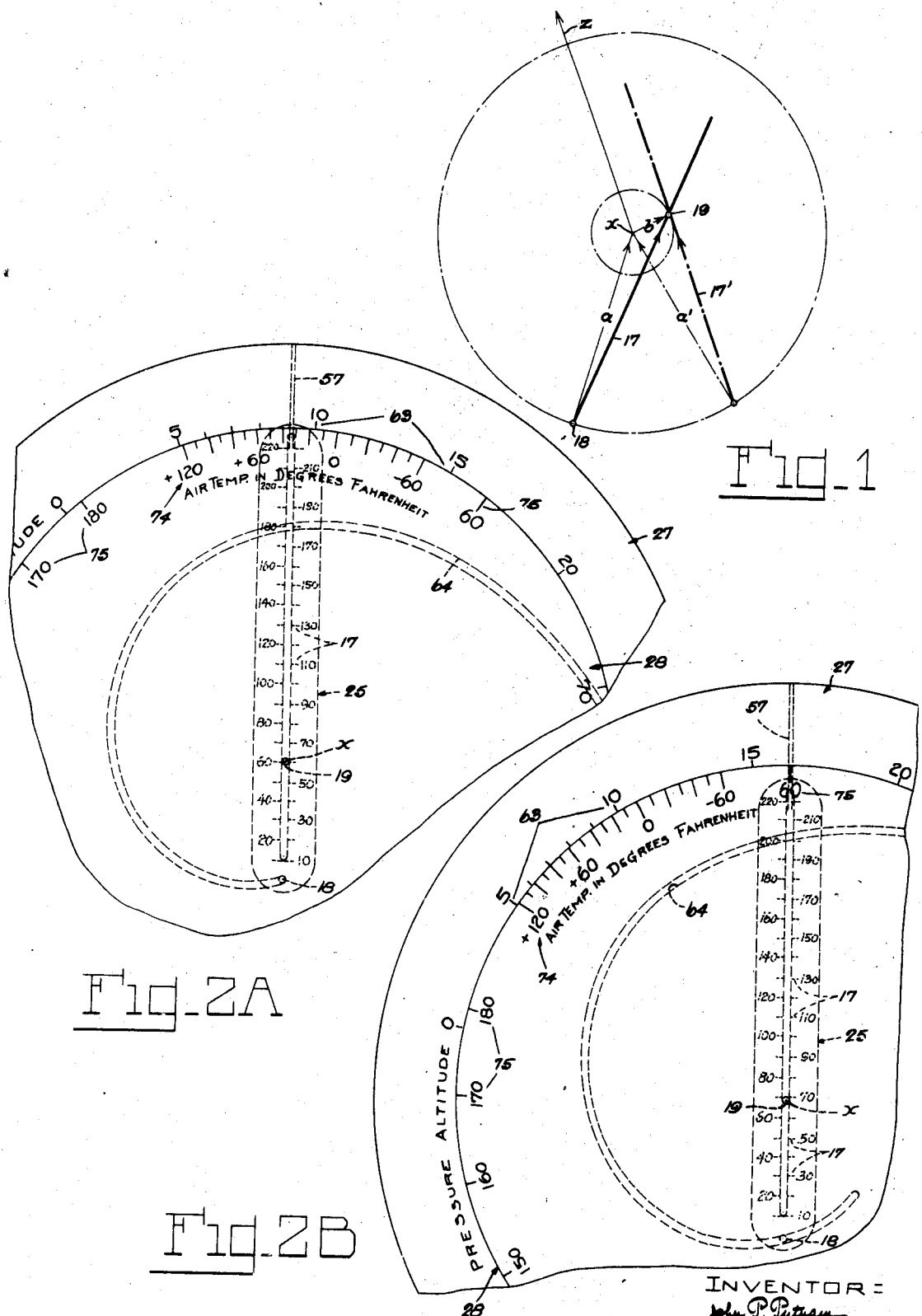

Referring to Fig. 1, there is illustrated diagrammatically the principle on which the present instrument is based. The reference numeral 17 designates a linear uniformly graduated scale carrying a transverse pivot or stud 18 at the zero point thereof and slidably receiving a floating pivot or stud 19. Each of the pivots 18 and 19 is independently movable radially of, and/or circularly about, a fixed common axis $x$. In using the instrument, the pivot 18 is, in any disposition of the scale 17, adjusted radially of the fixed axis $x$ such that the length of the radial arrow or vector $a$ represents, in the calibration of the scale 17, the indicated air speed of a plane. The floating pivot 19 is thereupon adjusted radially of, and/or circularly about, the fixed axis $x$ such that the radial arrow or vector $b$ points in the direction of the prevailing wind and its length represents, also in the calibration of the scale 17, the wind velocity. The scale 17 may then assume the full line position shown in Fig. 1, for instance, and point in the true direction of flight of the plane as well as indicate the ground speed of the same opposite the pivot 19 if the plane is headed in the direction of the vector $a$. However, the true bearing of the objective to be reached is represented by the arrow $z$, wherefore the track or true direction of flight of the plane has to coincide with said arrow. This is accomplished by merely circularly adjusting the pivot 18 about the fixed axis $x$ until the scale 17 assumes the dot-and-dash position 17' parallel to the true bearing $z$ of the objective. Such circular adjustment of the pivot 18 changes neither the length of the vector $a$ (representing the given indicated air speed of the plane), nor the length or angular disposition of the vector $b$ (representing the direction and velocity of the wind), with the result that the ground speed of the plane is indicated on the dot-and-dash line scale 17' opposite the pivot 19 when the plane is headed in the direction of the vector $a'$ but flies actually along the track $z$ due to side drift caused by the wind. If there is no wind, the pivot 19 is radially shifted into coextension with the common axis $x$ so that the wind vector $b$ becomes zero.

Figure 2:
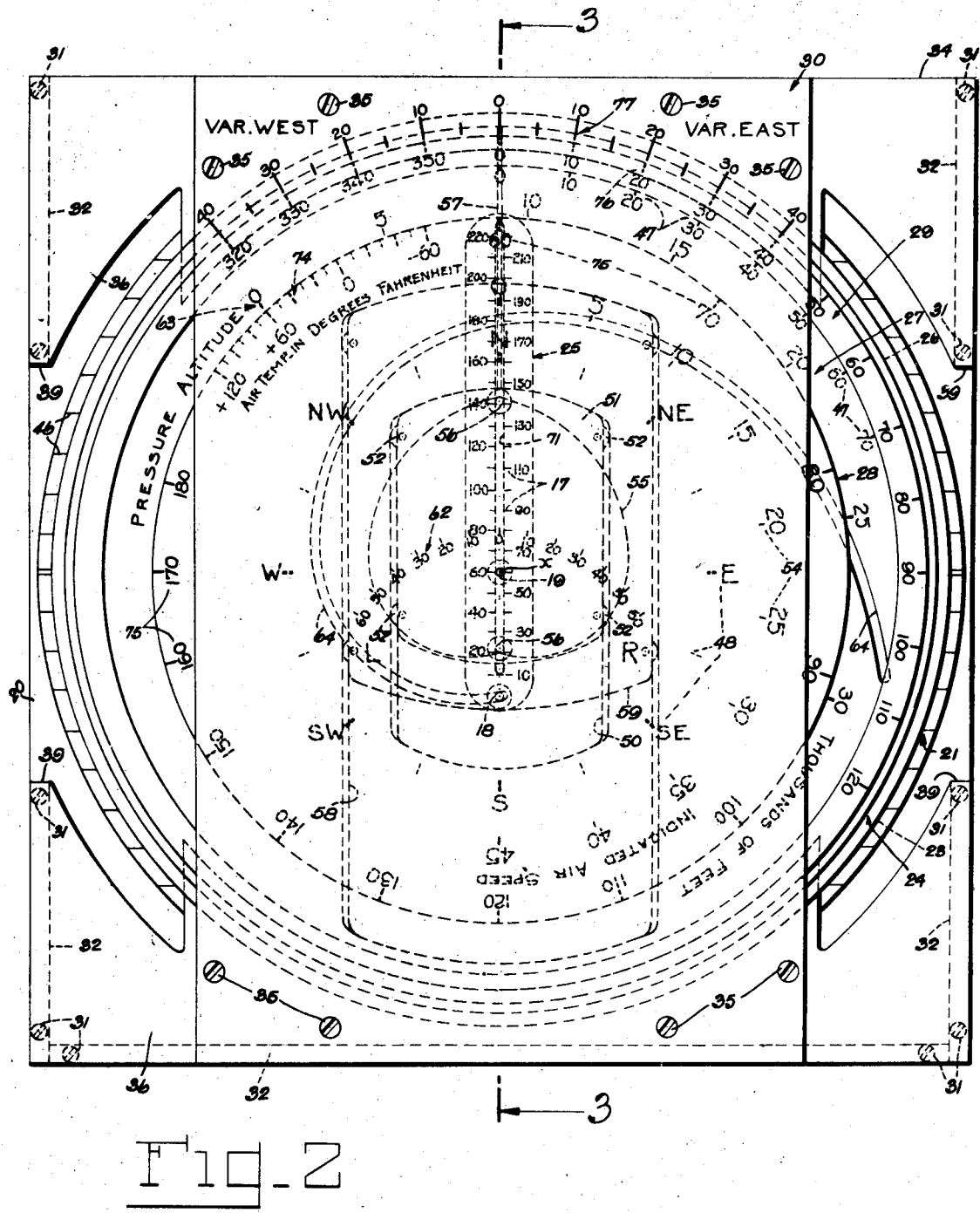
Fig. 2 is a top plan view of the instrument.
Figure 3:
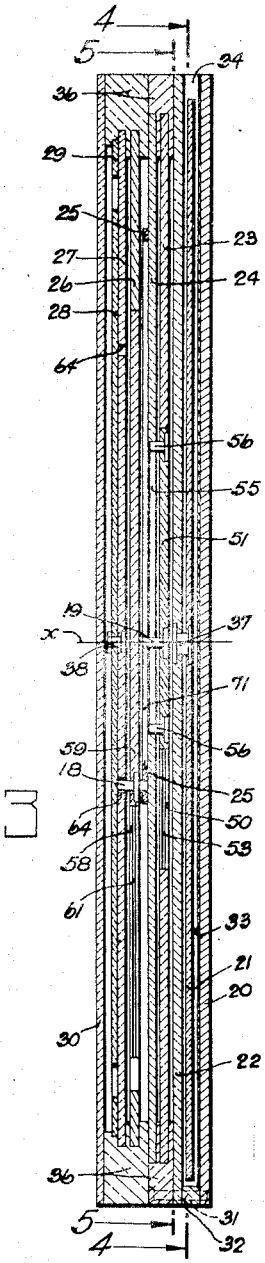
Fig. 3 is a section taken substantially on the line 3—3 of Fig. 2.

Referring now particularly to Figs. 2, 3 and 17, the instrument embodying the principle just described comprises a base plate 20 above which are disposed, in parallel superposed relation, and in the order named, a true track disc 21, a true compass point plate 22, a wind direction disc 23, a wind velocity disc 24, a track link 25 carrying the above-mentioned scale 17, a heading disc 26, an air speed disc 27, an air speed correction disc 28 and a coplanar magnetic compass ring 29, and a top or cover plate 30. All of the above-named parts, with the possible exception of the base plate 20, are composed of transparent (preferably sheet plastic) material to render visible, through overlying parts, scale graduations and other inscriptions (to be described) on underlying parts. The compass point plate 22 and top plate 30 are secured in fixed position with respect to the base plate 20. The compass point plate 22 is secured to the base plate 20 by screws 31 (Figs. 2, 3 and 5) which pass through spacer strips 32 of sufficient thickness to provide, between the plates 20 and 22, space for the track disc 21 and, between the latter disc and the base plate, space for a map section 33, said spacer strips being omitted at one edge of the instrument, as indicated at 34 in Figs. 2, 4 and 5, to permit insertion and replacement of said map section. The top plate 30 is secured to the plate 22 by screws 35 which pass through spacer blocks 36 of sufficient thickness to afford space for the remaining parts between the plates 22 and 30. The discs 21, 23, 24, 26, 27 and 28 and the compass ring 29 are all mounted for angular movement or adjustment about the previously mentioned common axis $x$, the discs 23, 24, 26 and 27 and the ring 29 being received at their peripheral edges in guide grooves formed in the spacer blocks 36 concentrically with respect to the common axis $x$, the disc 21 being rotatably mounted on the plate 22 through intermediation of a central pivot stud 37 (Fig. 3), and the disc 28 being rotatably mounted on the disc 27 through intermediation of a central pivot stud 38. The spacer strips 32 and spacer blocks 36 are terminated at opposite sides of the instrument, as indicated at 39 in Figs. 2, 4 and 5, to afford easy access to the peripheries of the discs 21, 23, 24, 26 and 27 for purposes of angular adjustment. The link 25 is interconnected with slides carried by the discs 23 and 26, as hereinafter further described.

Figure 4:
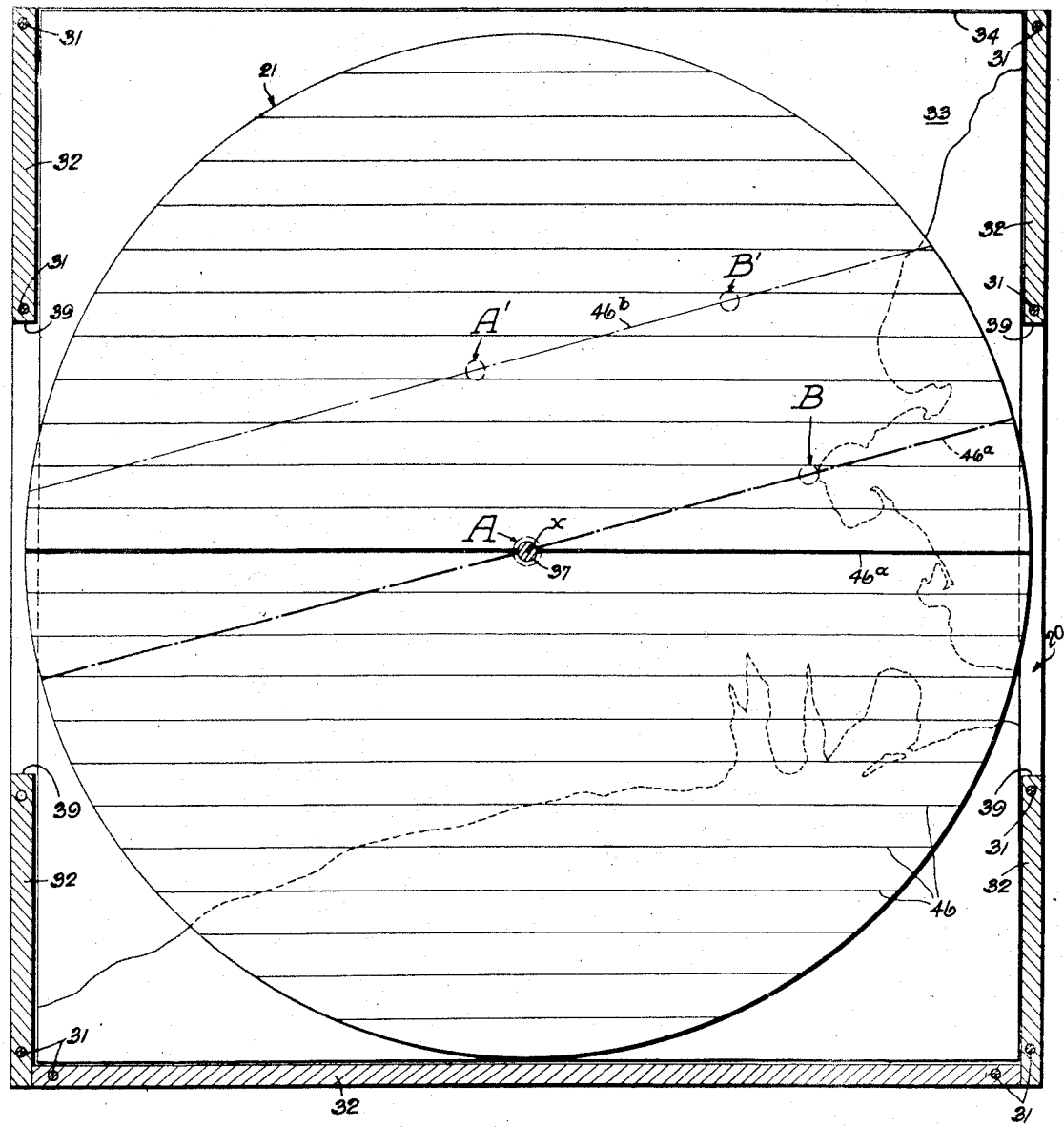
Fig. 4 is a section taken substantially on the line 4—4 of Fig. 3, showing the true track disc in plan.

Referring to Fig. 4, the true track disc 21 is ruled with spaced parallel lines 46, of which one (designated 46a) passes through the common axis $x$. Said disc 21 may be angularly positioned to cause one of said lines 46 to extend between a point of departure A and an objective point B on the underlying map section 33. If said map section can be conveniently so positioned as to locate the point A thereon at the center of the instrument, the line 46a may be used for this purpose, as shown in dot-and-dash lines in Fig. 4. Otherwise, the map section may be placed to locate said points (as indicated at A' and B' in Fig. 4) so that they may be connected by one of the other lines 46, for example the line 46b, or if even this is inconvenient, the disc 21 may be so angularly positioned as to cause the line or lines 46 which pass nearest said points to extend as nearly parallel as may be to a line (imaginary or actually drawn on the map section) connecting the points.

Referring to Fig. 5, the true compass point plate 22 is inscribed with a concentric scale 47 graduated in degrees and reading in azimuth, and preferably also with a second concentric scale 48 marked with the usual points of the compass. The arrangement is such that when the disc 21 is so angularly adjusted (Fig. 4) that a line 46 thereon is coincident with, or parallel to, a straight line connecting a given point of departure with a given objective, as above explained, the line 46a will indicate on the scale 47 the true compass bearing of the track from the point of departure to the objective. For example, as shown in Fig. 15, the disc 21 is adjusted into the angular position illustrated in dot-and-dash lines in Fig. 4, indicating, by the point of intersection of the line 46a with the scale 47, that the true bearing or track from A (or A') to B (or B') is azimuth 75°.

Referring to Fig. 6, the wind direction disc 23 has inscribed thereon a radial index line 49 adapted to cooperate with either scale 47 or 48 on the plate 22 (Fig. 5), and is formed with a cut-out guideway 50 disposed radially or diametrically of the disc, and whose center line is in alinement with the index line 49. Guided in the guideway 50, for movement diametrically of the disc 23, is a slide 51 (see Figs. 2, 3, 7, 15 and 17). The side edges of the slide 51 may slidably engage the parallel edges of the guideway 50 or, preferably, said slide is provided with disc-like rollers 52 (Fig. 7) which ride in grooves 53 (Figs. 3 and 6) in said guideway edges.

Referring to Fig. 8, the wind velocity disc 24 is inscribed with a concentric scale 54 preferably 180° in length and graduated to represent wind velocities in miles per hour, the graduations being preferably uniformly spaced. Centrally, the disc 24 is formed with an opening 55 the edge of which constitutes a heart-shaped internal cam whose maximum radius is radially opposite the zero point on the scale 54 and whose minimum radius is radially opposite the maximum point on said scale, herein shown as representing 45 miles per hour. The cam edge of the opening 55 is engaged, at diametrically opposite points, by pins or studs 56 (Figs. 2, 3, 7, 15 and 17) carried by the slide 51, whereby the position of said slide in its guideway 50 is determined by the relative angular position of the discs 23 and 24.

Figure 9:
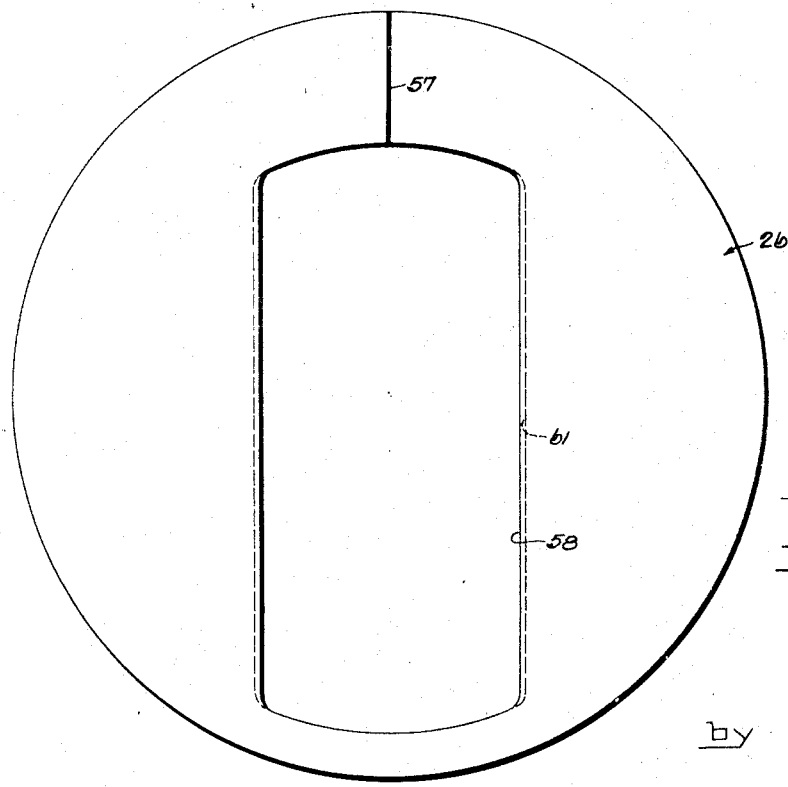
Fig. 9 is a detail plan view of the heading disc.
Figure 10:
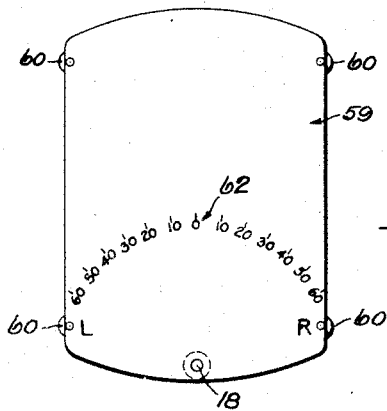
Fig. 10 is a detail plan view of the heading disc slide.

Referring to Fig. 9, the heading disc 26 is inscribed with a radial index line 57 and formed with a diametric guideway 58, the arrangement of said index line and guideway being similar to that of the index line 49 and guideway 50 of the disc 23 (Fig. 6). Movable in the guideway 58 is a slide 59 (Figs. 2, 3, 10 and 15) which is similar to the slide 51 (Fig. 7) and, like the latter, preferably provided with disc rollers 60 (Fig. 10) received in grooves 61 (Figs. 3 and 9) in the parallel edges of the guideway 58. The slide 59 is preferably inscribed with an arcuate scale 62 graduated to represent drift angles, left and right.

Figure 11:
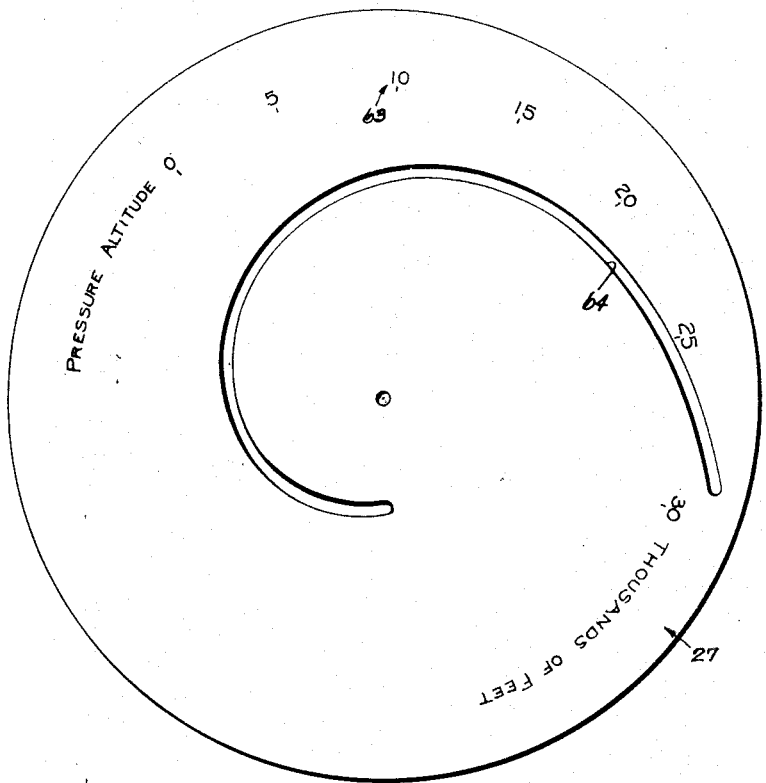
Fig. 11 is a detail plan view of the air speed disc.

Referring to Fig. 11, the air speed disc 27 is inscribed with a concentric scale 63 graduated to represent altitudes in thousands of feet, the graduations being logarithmically spaced for a purpose hereinafter described. Said disc 27 is also provided with a cam slot 64 in the shape of a logarithmic spiral. The slot 64 receives the previously mentioned pivot or stud 18 (Figs. 1, 2, 3, 10, 15 and 17) on the slide 59, whereby the position of said slide in its guideway 58 is determined by the relative angular position of the discs 26 and 27.

Referring to Fig. 12, the track and ground speed link 25 is formed with a centrally disposed longitudinal slot 71 along the side or sides of which is inscribed the earlier mentioned scale 17 uniformly graduated to represent ground speeds in miles per hour. The link 25 is at the zero point of the scale 17 connected with the pivot or stud 18 (Figs. 2, 3, 10, 15 and 17), while the slot 71 receives the previously mentioned pivot or stud 19 (Figs. 1, 2, 3, 7, 15 and 17) on the slide 51.

Referring to Fig. 13, the air speed correction disc 28 is inscribed about a portion of its margin with a concentric scale 74, graduated to represent temperatures preferably in degrees Fahrenheit, and about the remainder of its margin with a concentric scale 75 graduated to represent indicated air speeds in miles per hour, the graduations of both scales being logarithmically spaced for a purpose hereinafter explained. The logarithmic scale 74 is adapted to cooperate with the logarithmic altitude scale 63 of the disc 27 (Figs. 2, 11, 15 and 17) to apply air speed correction for altitude and temperature.

Referring to Figs. 2 and 14, the magnetic compass ring 29 is inscribed with a concentric scale 76 graduated in degrees and indicating azimuth compass bearings. The top plate 30 is inscribed adjacent the scale 76, with a concentric scale 77 graduated in degrees and indicating magnetic compass variations, east and west. By setting the ring 29 so that the zero point on the scale 76 thereof is in register with that graduation on the scale 77 which corresponds to the magnetic compass variation in a given locality, the scale 76, in conjunction with the scale 47 (Figs. 2, 15 and 16), will indicate, for that locality, the magnetic bearings or azimuths corresponding to true bearings or azimuths, and vice versa.

The scales 54, 63, 74 and 75, representing wind velocities, altitudes, temperatures and air speeds, respectively, being circularly arranged, permit a wider range and more open spacing of their graduations than would be possible with rectilinear scales. The several circular or circumferential scales 47, 48, 54, 63, 74, 75, 76 and 77, while concentrically disposed, are located at different radial distances from the common axis $x$, so that, in all positions of adjustment, all are clearly visible and unobscured by any of the others, and therefore can be easily read. The ground speed scale 17 on the link 25 cooperates with the pin 19, as hereinafter explained, and in practically all positions of adjustment, at least those likely to be more frequently used, the position of the pin 19 and of the portion of the scale 17 adjacent thereto, is within or removed from all of the other scales, thereby facilitating the reading of the ground speed on said scale 17.

It will be observed in Fig. 2 that the indicated air speed on the logarithmic scale 75 of the air speed correction disc 28 opposite the index line 57 on the heading disc 26 is the same (60 miles per hour) as that on the uniformly graduated ground speed scale 17 on the link 25 opposite the common axis $x$, if the pivot 19 is coextensive with the common axis $x$ (meaning no wind correction) and the discs 27 and 28 assume the relative angular position shown in Fig. 2 in which the zero mark of the logarithmic altitude scale 63 is opposite the +60° mark of the logarithmic temperature scale 74. The logarithmic spiral cam 64 is so coordinated with the speed scales 75 and 17 that, with the parts coordinated as just described, and on rotation of the disc 26 relative to discs 27 and 28, or vice versa any other speed indication on the scale 75 opposite the index line 57 will coincide with the speed indication on the scale 17 opposite the axis $x$. The logarithmically spaced graduations of the temperature and altitude scales, though inscribed in degrees Fahrenheit and thousands of feet, respectively, represent factors by which the indicated air speed of a plane has to be multiplied in order to obtain the true air speed of the plane at corresponding altitudes and temperatures. Since it is standard practice to give the indicated air speed of a plane at +60° F. and at sea level or zero altitude, the +60° F. mark on the temperature scale 74 and the zero mark on the altitude scale 63 represent the factors 1 (unity), and these scales are so coordinated that said factors 1 (unity), if aligned as shown in Fig. 2, undertake no correction of the indicated air speed as is evidenced by the identical speed indications on the scales 75 and 17 opposite the index line 57 and the axis $x$, respectively. For any other altitude and/or temperature the air speed correction disc 28 is turned relative to the air speed disc 27 until the respective altitude and temperature marks on the scales 63 and 74 are brought into alignment, with the result that the speed scale 75 is angularly displaced, from the relative angular position of the discs 27 and 28 shown in Fig. 2, an amount which is proportional to the algebraic sum of the logarithms of the altitude and temperature factors by which the indicated air speed has to be multiplied in order to obtain the true air speed. In this connection, it will be observed from Fig. 2 that the factors for temperatures between +59° and —60° F. are less than 1, wherefore their logarithms are negative. All other factors on the logarithmic correction scales 63 and 74 are 1 or larger than 1 and their logarithms are positive. By angularly adjusting the air speed correction disc 28 in accordance with a certain altitude other than zero and/or a certain temperature other than +60° F., as described, the discs 27 and 28 are relatively angularly displaced, from their "no-correction" relative angular position (Fig. 2), an amount which, for any indicated speed on the scale 75 opposite the index line 57, results in a radial shifting of the pivot 18 through a distance which, in the calibration of the ground speed scale, represents the corresponding speed correction. As an example, let it be assumed that the indicated air speed of a plane is 60 miles per hour and the various parts of the instrument are set as shown in Fig. 2, the true air speed of the plane at 7000 ft. altitude and +80° F. may then be obtained by turning the air speed correction disc 28 clockwise as viewed in Fig. 2 relative to the air speed disc 27 until the +80° F. mark on the scale 74 aligns with the 7000 ft. altitude mark on the scale 63 (Fig. 2A). Thereupon, the discs 27 and 28 are turned in unison counter-clockwise as viewed in Fig. 2A until the 60 mile mark on the indicated air speed scale 75 aligns with the index line 57 (Fig. 2B), whereupon the speed indication on the ground speed scale 17 opposite the axis x represents the true air speed (approximately 68 miles per hour). The true air speed is always proportional to the distance between the pivot 18 (zero point of ground speed scale 17) and the common axis x, and a straight line connecting said pivot 18 and axis x is, in any position of the ground speed scale 17, a vector like the vector a in Fig. 1, considering thereby that the latter vector in Fig. 1 represents, in the calibration of the ground speed scale 17, the indicated air speed plus (or minus, as the case may be) the speed correction due to altitude and/or temperature. The direction of this vector may, of course, be changed at will, without changing its length, by merely turning the discs 26 and 27 in unison.

The uniformly graduated wind velocity scale 54 and the cam 55 on the wind velocity disc 24 (Fig. 8), and the index line 49 on the wind direction disc 23 (Fig. 6), are so coordinated that the pivot 19 on the slide 51 (Fig. 7) is coextensive with the common axis x on alignment of said index line 43 with the zero point of said scale 54 (Fig. 2), and is shifted radially of the wind direction disc 23, on relative rotation between the discs 23 and 24 through any speed range on the scale 54, through a distance which is equal to the same speed range on the ground speed scale 17. Hence, a straight line connecting the axis x with the pivot 19 (Fig. 1) represents a wind direction and velocity vector which may be properly combined with the true air speed vector above described to form a parallelogram of motion.

The use of the instrument may be explained in connection with the following illustrative example, reference being had particularly to Figs. 2, 4, 15 and 16. Assume that a flight is to be made from the point A (Fig. 4) to the point B, that the compass variation for the locality is 20° east, that the indicated air speed of the plane is 150 miles per hour, that the pilot is flying at an altitude of 5000 ft., that the temperature is +80° F., and that the wind is blowing 40 miles per hour from the northwest. The adjustments of the instrument for these conditions are shown in Fig. 15 and diagrammatically indicated in Fig. 16. The magnetic compass ring 29 is set to bring the zero point of the scale 76 opposite the graduation of the scale 77 which indicates 20° east. The disc 21 is turned to bring the most convenient line 46 thereon parallel to, or coincident with, the line connecting the points A and B on the map section 33, as above explained. The line 46a will then indicate on the scale 47 the true bearing, and on the scale 76 the magnetic bearing of the point B from the point A; i. e., the track or true course to be flown. As shown in Figs. 15 and 16, the true bearing is azimuth 75° and the magnetic bearing azimuth 55°. If this bearing is known, the disc 21 may be turned to indicate this directly without reference to the map. The air speed correction disc 28 is turned with respect to the air speed disc 27 to bring the graduation of the scale 74 representing +80° F. opposite the graduation of the scale 63 representing 5000 ft. The air speed disc 27, carrying with it the adjusted correction disc 28, is then turned to bring the graduation of the scale 75 corresponding to 150 miles per hour opposite the index line 57 on the heading disc 26. The wind velocity disc 24 is turned with respect to the wind direction disc 23 to bring the graduation of the scale 54 representing 40 miles per hour opposite the index line 49, and the two discs 23 and 24 then turned in unison to bring the index line 49 into register with the NW point of the scale 48 on the compass point plate 22. The heading disc 26 and air speed disc 27 (the latter still carrying with it the correction disc 28 in fixed angularly adjusted position with respect thereto) are then turned in unison until the link 25 is brought into parallelism with the most convenient line or lines 46 on the track disc 21, this corresponding to the circular adjustment of the pivot 18 in Fig. 1 into the position in which the scale 17 assumes the dot-and-dash line position 17' shown in said Fig. 1, i. e. parallel to the compass direction of the objective. The magnetic compass course or heading is then indicated by the index line 57 on the scale 76 (and the true compass heading on the scale 47), while the ground speed is indicated by the position of the pivot 19 with respect to the scale 17 on the link 25. The adjustments above described and illustrated in Fig. 15 (as well as diagrammatically indicated in Fig. 16) show that, in order to fly a track whose true bearing is azimuth 75° under the conditions above stated, the pilot's magnetic compass course or heading should be azimuth 44° and that his ground speed is about 183 miles per hour. The wind drift angle is indicated by the center line of the link 25 on the scale 62, being, in the example given and adjustment shown, about 12° right. Inasmuch, however, as the setting of the instrument for given conditions shows directly the compass heading required under such conditions, it is not absolutely necessary to know the drift angle, and the scale 62 may, if desired, be omitted, thereby facilitating the reading of the scale 72 (i. e. the position of the pin 19 with respect thereto) under some circumstances.

It will be observed that the true course or track, the wind velocity and direction, the true and magnetic compass headings, the air speed, and the ground speed are all independently indicated on separate scales, making it unnecessary to change the adjustment for any of these factors in order to determine another or others, so that indications of all factors are available at all times.

I claim:

1. A navigation instrument, comprising two relatively coaxially turnable discs, a straight link parallel to said discs, a first transverse pivot on said link radially slidable in one disc, another pivot parallel to said first pivot slidable on said link and radially slidable in the other disc, and mechanism for adjusting either pivot radially of its respective disc.

2. A navigation instrument, comprising two relatively coaxially turnable discs, a straight link parallel to said discs, a first transverse pivot on said link radially slidable in one disc, another pivot parallel to said first pivot slidable on said link and radially slidable in the other disc, and cams independently turnable coaxially of said discs for adjusting said pivots, respectively, radially of their respective discs.

3. A navigation instrument, comprising two relatively coaxially turnable discs, a straight link between and parallel to said discs, a first transverse pivot on said link radially slidable in one disc, another pivot parallel to said first pivot slidable on said link and radially slidable in the other disc, and cams independently turnable coaxially of said discs on opposite sides of said link for adjusting said pivots, respectively, radially of their respective discs.

4. A navigation instrument, comprising two relatively coaxially turnable discs, a straight link element parallel to said discs, a first transverse pivot on said link element radially slidable in one disc, another pivot parallel to said first pivot slidable on said link element and radially slidable in the other disc, said one disc having a radial pointer element diametrically aligned with said first pivot, mechanism for adjusting either pivot radially of its respective disc, and a member turnable coaxially of said discs and provided with a diametric line with which either of said elements may be aligned.

5. A navigation instrument, comprising two relatively coaxially turnable discs, a straight link parallel to the said discs, a first transverse pivot on said link radially slidable in one disc, another pivot parallel to said first pivot slidable on said link and radially slidable in the other disc, said one disc having a radial pointer diametrically aligned with said first pivot, mechanism for adjusting either pivot radially of its respective disc, a member turnable coaxially of said discs and provided with a diametric line, and a fixed compass dial to cooperate with said line and pointer.

6. A navigation instrument, comprising two relatively coaxially turnable discs, a straight link parallel to said discs, a first transverse pivot on said link radially slidable in one disc, another pivot parallel to said first pivot slidable on said link and radially slidable in the other disc, said one disc having a radial pointer diametrically aligned with said first pivot, mechanism for adjusting either pivot radially of its respective disc, a transparent direction disc turnable coaxially of the other discs and provided with a multitude of visible straight parallel lines of which one is diametric, and a fixed compass dial to cooperate with said diametric line and pointer.

7. A navigation instrument, comprising two relatively coaxially turnable discs, a straight link parallel to said discs, a first transverse pivot on said link radially slidable in one disc, another pivot parallel to said first pivot slidable on said link and radially slidable in the other disc, said one disc having a radial pointer diametrically aligned with said first pivot, mechanism for adjusting either pivot radially of its respective disc, a member turnable coaxially of said discs and provided with a diametric line, a fixed compass dial cooperable with said line and pointer, and another compass dial independently turnable coaxially of said discs and also cooperable with said line and pointer to provide for local magnetic compass variation.

8. A navigation instrument, comprising two relatively coaxially turnable discs, a straight link parallel to said discs, a first transverse pivot on said link radially slidable in one disc, another pivot parallel to said first pivot slidable on said link and radially slidable in the other disc, each disc having a radial pointer diametrically aligned with its respective pivot, mechanism for adjusting either pivot radially of its respective disc, a member turnable coaxially of said discs and provided with a diametric line, and a fixed compass dial to cooperate with said line and pointers.

9. A navigation instrument, comprising two discs independently turnable about a common axis, a uniformly graduated linear speed scale longitudinally movable radially of said axis, one of said discs having a concentric logarithmic speed scale and the other disc having a logarithmic spiral cam cooperating with said linear scale, and pointers cooperating with said scales, respectively, said discs having also cooperating concentric logarithmic speed correction factor scales, respectively, each including a mark representing the factor 1, and said logarithmic scales, cam and pointers being so coordinated that any readings on the speed scales opposite their respective pointers coincide when said marks align.

10. A navigation instrument, comprising two discs independently turnable about a common axis, a uniformly graduated linear speed scale parallel to said discs having at the zero point thereof a first pivot parallel to, and movable radially of, said axis, a second pivot parallel to said first pivot and slidable on said scale longitudinally thereof, one of said discs having a concentric logarithmic speed scale and the other disc having a logarithmic spiral cam cooperating with said first pivot, a pointer cooperating with said logarithmic scale, said discs having also cooperating concentric logarithmic speed correction factor scales, respectively, each including a mark representing the factor 1, and said logarithmic scales, cam and pointer being so coordinated that any reading on the logarithmic speed scale opposite said pointer coincides with that on the linear speed scale opposite said second pivot when said marks align and said second pivot is coextensive with said common axis, and mechanism for moving said second pivot radially of, and circularly about, said common axis.

11. A navigation instrument as set forth in claim 10, further comprising a compass dial independently turnable about said common axis, and said pointer being diametrically aligned with said first pivot and adapted to cooperate with said compass dial.

12. A navigation instrument as set forth in claim 10, further comprising a disc element which is independently turnable about said common axis, receives said first pivot for movement radially thereof and carries said pointer.

13. A navigation instrument as set forth in claim 10, further comprising a disc element which is independently turnable about said common axis, receives said first pivot for movement radially thereof, carries said pointer and has a radial line diametrically aligned with said first pivot, and a compass dial to cooperate with said line.

14. A navigation instrument as set forth in claim 10, further comprising a disc element which is independently turnable about said common axis, receives said first pivot for movement radially thereof and carries said pointer diametrically aligned with said first pivot, and a compass dial to cooperate with said pointer.

15. A navigation instrument as set forth in claim 10, in which said mechanism comprises two disc members independently turnable about said common axis, one of said members having a mark and receiving said second pivot for movement radially thereof and the other member having a cam element cooperating with said second pivot and a uniformly graduated concentric speed scale element, the latter being so coordinated with said cam element and mark that said second pivot is coextensive with said common axis on alignment of said mark with the zero point of said scale element, and is shifted radially of said one disc member, on relative rotation between said mark and scale element through any speed range on the latter, through a distance equal to the same speed range on said linear scale.

16. A navigation instrument, comprising two discs independently turnable about a common axis, a uniformly graduated linear speed scale parallel to said discs having at the zero point thereof a first pivot parallel to said axis, a member independently rotatable about said common axis receiving said first pivot for movement radially thereof and having a mark diametrically aligned with said first pivot and a pointer, a second pivot parallel to said first pivot and slidable on said scale longitudinally thereof, one of said discs having a concentric logarithmic speed scale cooperable with said pointer and the other disc having a logarithmic spiral cam cooperating with said first pivot, said discs having also cooperating concentric logarithmic speed correction factor scales, respectively, each including a point representing the factor 1, and said logarithmic scales, cam and pointer being so coordinated that any reading on the logarithmic speed scale opposite said pointer coincides with that on the linear speed scale opposite said second pivot when said points representing the factors 1 align and said second pivot is coextensive with said common axis, two disc elements independently turnable about said common axis, one disc element receiving said second pivot for movement radially thereof and having a mark diametrically aligned with said second pivot and a pointer element and the other disc element having a cam element cooperating with said second pivot and a uniformly graduated concentric speed scale element, the latter being so coordinated with said cam element and pointer element that said second pivot is coextensive with said common axis on alignment of said pointer element with the zero point of said scale element, and is shifted radially of said one disc element, on relative rotation between said pointer element and scale element through any speed range on the latter, through a distance equal to the same speed range on said linear scale, and a compass dial to cooperate with said marks.

17. A navigation instrument as set forth in claim 16, in which said pointers on said one disc element and member, respectively, coincide with said marks thereon.

JOHN P. PUTNAM.